May 13, 1930. A. M. GUILLET Re. 17,665
MEANS FOR LEVELING AND LINING SPINNING FRAMES
Original Filed April 1, 1926 3 Sheets-Sheet 1
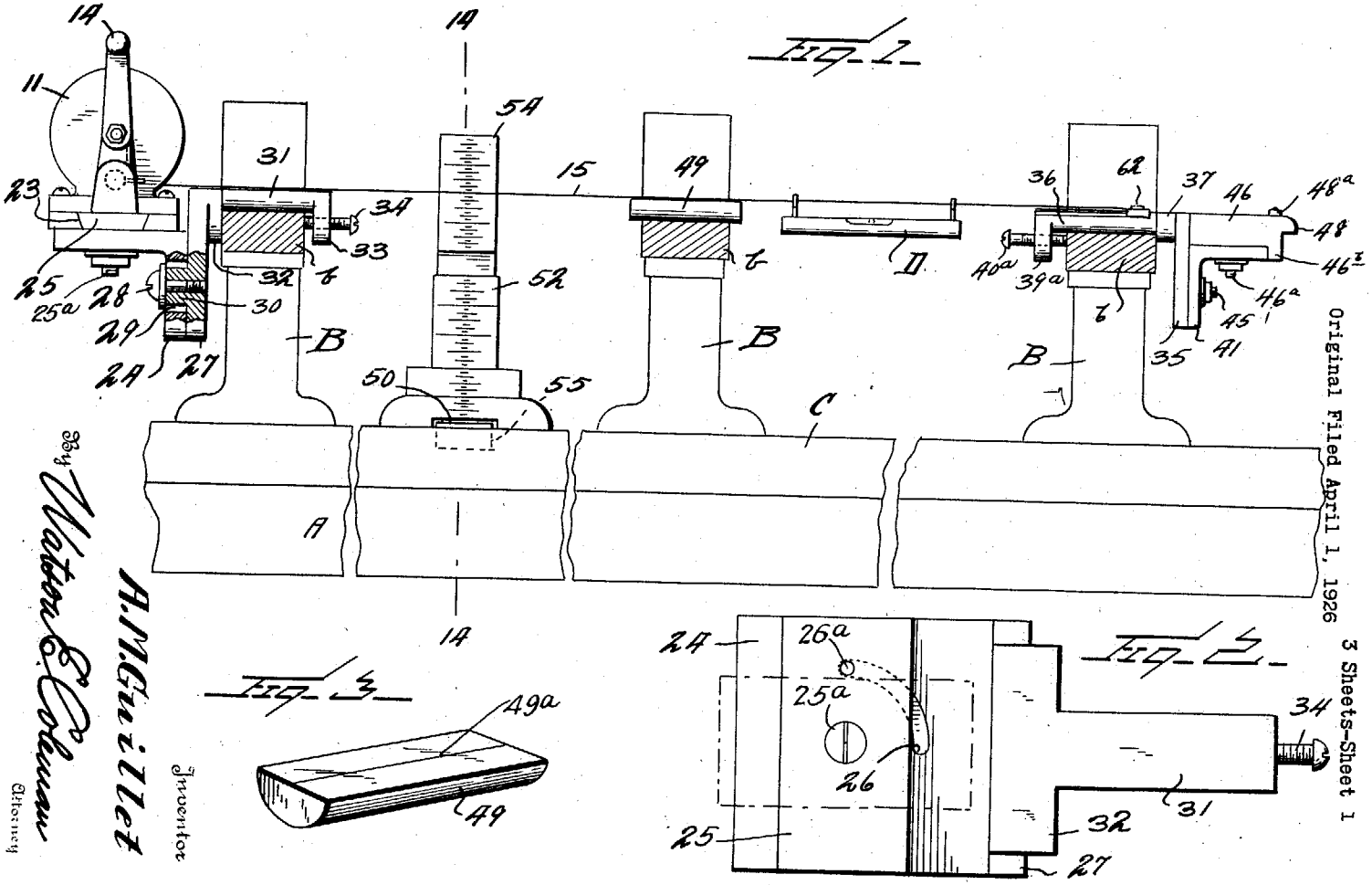
Inventor
A. M. Guillet
By Watson E. Coleman
Attorney

A. M. GUILLET

May 13, 1930. MEANS FOR LEVELING AND LINING SPINNING FRAMES Re. 17,665

3 Sheets-Sheet 2

Original Filed April 1, 1926

Inventor

A. M. Guillet

By Watson E. Coleman

Attorney

May 13, 1930. A. M. GUILLET Re. 17,665

MEANS FOR LEVELING AND LINING SPINNING FRAMES

Original Filed April 1, 1926 3 Sheets-Sheet 3

Inventor

A. M. Guillet

By Watson E. Coleman

Attorney

Reissued May 13, 1930 Re. 17,665

UNITED STATES PATENT OFFICE

ALBERT M. GUILLET, OF CHARLOTTE, NORTH CAROLINA

MEANS FOR LEVELING AND LINING SPINNING FRAMES

Original No. 1,616,084, dated February 1, 1927, Serial No. 99,128, filed April 1, 1926. Application for reissue filed January 30, 1929. Serial No. 336,236.

This invention relates to the art of lining up and leveling the frames of machines, such as the horizontal elements of twisting and winding machines, and is adapted to be used in connection with various types of machinery, and embodies certain improvements in the construction for this purpose illustrated and claimed in my former Patent, #1,531,652, granted on the 31st day of March, 1925, on rail gauges for spinning frames.

In the said patent I disclose a leveling and lining-up device including a pair of clamps adapted to be disposed over the roll supporting beam and the thread board of a spinning machine, one of these clamps carrying upon it a reel upon which was wound a wire. The other clamp was provided with means for engaging and anchoring the opposite end of the wire from the reel, the idea being to stretch this wire along the beam from end to end thereof, then turn the reel in the reverse direction until the wire was absolutely taut, and then gauge any depression or undue elevation of any portion of the beam by this wire, it being obvious that the wire, if it was held in the same spaced relation from the beam at its opposite ends, would show any horizontal deviation of the beam. In connection with this wire, I also in this patent disclosed a gauge comprising a block formed with a vertical series of graduations which was movable along the beam and whereby any undue depression or elevation of the beam relative to the wire at any one point could be readily determined. This apparatus, while it was effective for the purpose of leveling the beam, could not be used for the purpose of lining up the beam or like parts, that is, for the purpose of discovering whether the front edge of the beam was in perfect vertical alinement along its entire extent and correcting any deviation.

The general object of my present invention, therefore, is to provide a mechanism of the same general characteristics as the mechanism heretofore disclosed, but which is so constructed that it may be used not only for horizontally leveling the longitudinal beams, rolls, or a series of horizontal elements, but may also be used for vertically lining said beams, rolls or horizontal elements, thus permitting the workman overhauling the mechanism to perform in one operation what has heretofore taken three operations.

A further object is to provide wire holding means which can be attached to and engaged with the roll stands of spinning frames and other machinery to thus do away with the necessity of the relatively large clamps shown in my prior patent, which have to be large in order to extend over the thread board of the spinning machine and engage the roll stand supporting beam, and further, because I have discovered that a better result may be obtained by gauging the alinement of the parts from the roll stands. Furthermore, by correlating a taut wire with the roll stands, which stands are mounted upon the roll beam, and noting whether the wire touches all of the roll stands at exactly the same point, a correct indication is given for the proper alinement both vertically and horizontally of the roll stands, and by employing a gauge of peculiar construction, which is illustrated, described and claimed specifically in my patent numbered 1,591,485, granted July 6, 1926, and filed August 25, 1925, any horizontal or vertical deviation of the roll beam may be readily noted and corrected, and thus one of the objects attained by the present invention is to horizontally and vertically aline not only the beam itself, but the roll stands or any other part which may require such alinement.

A still further object is to provide an anchoring member which is longitudinally slotted at a plurality of points for engagement with the free end of the wire and which is provided with a guard for preventing any slipping out of the wire from said slots, and in this connection to provide means preferably attached to the last-named member whereby the degree of tension on the wire may be noted so that due allowance may be made for any sag in the wire, it being remembered that the longitudinally extending spindle rails, rolls and beams of a spinning machine are approximately forty-five feet long and that, therefore, some sag in the wire is bound to occur, and by noting the degree of tension to which the wire is subjected the amount of sag in the wire may be allowed for.

Another object is to provide a gauge adapted to be disposed in the forward roll bearing or seat of any of the intermediate roll stands between the first and last stands.

Still another object is to provide a reel base and anchoring base which are adapted to be mounted upon the roller beam and secured by the lever screw which engages the forward end of the weighted lever which normally urges the front saddle of the roll-stand downward.

A further object is to provide bases for the reel and for the anchoring devices which are so arranged as to permit the wire from the reel to be carried not only longitudinally along the machine, but transversely thereof to thus aline and level the machine transversely as well as longitudinally, and in this connection to provide a base having a pivoted dove-tailed member upon which the reel and upon which the anchoring device will slide, and to provide means whereby this dove-tailed member may be shifted through a quarter of a circle to thus shift the anchoring member into position either for longitudinal or transverse work.

A still further object is to provide means of the character described which, by securing upon the roll stands, will permit the lining up of the stands, the beam, both top and side, and which will do away with the heavy clamps and permit the use of a spirit level, and in this connection to provide a device of this character which may be used for lining up the spindle rail.

Other objects will appear in the course of the following description.

My invention is illustrated in the accompanying drawings, wherein:—

Figure 1 is a front elevation of the roll beam of a spinning machine and the roll stands thereon, showing my leveling and lining mechanism applied thereto;

Figure 2 is a top plan view of the reel support;

Figure 3 is a perspective view of the intermediate filler block;

Referring to these drawings, it will be seen that I have illustrated my device as applied to lining up the roll stands of a spinning frame, though it will be understood that it may be used on a fly frame, or any textile machinery having rolls, or indeed on large varieties of different mechanisms.

Figure 5:
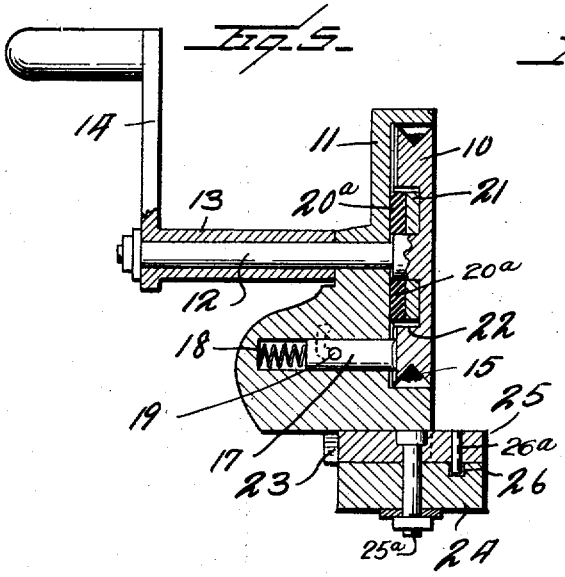
Figure 5 is a section on the line 5—5 of Figure 4.

In the drawings A represents the roll stand supporting beam of a spinning frame, B the roll stands themselves, and C designates the thread board of the spinning frame. My lining and leveling device includes a reel, which is illustrated in some detail in Figure 5, and comprises the reel proper, designated by the numeral 10, which is mounted upon a supporting plate 11. The reel 10 has a stem 12 which extends out through a suitable bearing in the plate 11, and mounted upon this stem is the sleeve 13 having the usual crank handle 14. The periphery of the reel 10 is grooved for the reception of the wire 15, which is attached to the reel in any suitable manner. The plate 11 extends out over the periphery of the reel 10 and the wire passes through a slot in this plate.

The inner face of the reel 10 is formed with a circular series of ratchet notches 16, and disposed in the plate 11 is a spring actuated pawl 17 having a tooth engaging in these notches and the pawl permitting the rotation of the reel 10 in one direction, but preventing its rotation in the other direction unless the pawl is withdrawn against the action of the spring 18, which forces the pawl against the reel 10. The pawl 17 has a laterally projecting pin 19 extending through a slot 20 whereby the pawl may be manually retracted to permit the initial unreeling of the wire 15.

Preferably, and in order to prevent the too rapid unreeling of the wire 15, which would tend to cause the wire to overrun and thereby kink, I provide means to prevent the reel from too rapid movement, and while I do not wish to be limited to any particular means for this purpose, I have illustrated a washer $20^a$ which is preferably of hard fiber or like material, and a split washer 21 which is slightly helical in form and disposed against the washer $20^a$. Both of these washers are disposed within a recess 22 formed in the inner face of the reel and the action, of course, is to restrain the movement of the reel 10 under the action of the handle 14.

Figure 4:
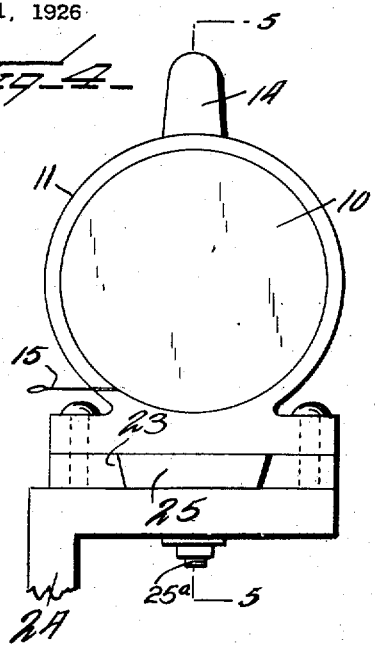
Figure 4 is a face view of the reel.
Figure 6:
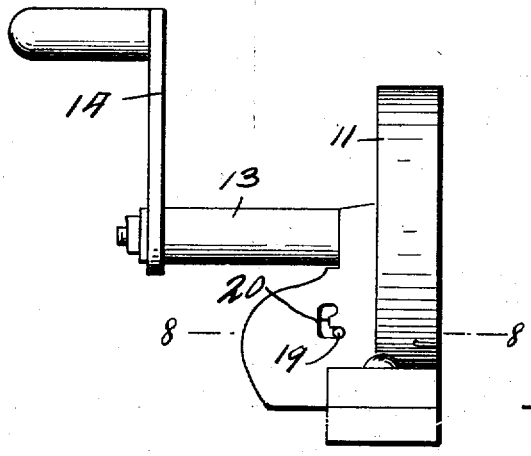
Figure 6 is an end elevation of the reel.
Figure 7:
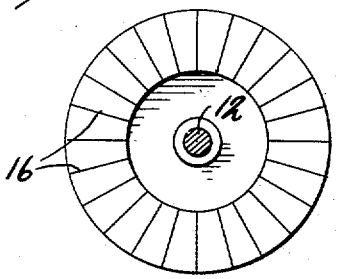
Figure 7 is an inner face view of the reel.
Figure 9:
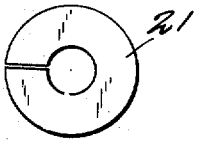
Figure 9 is a side elevation of the split washer.
Figure 8:
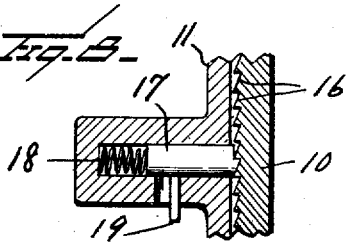
Figure 8 is a fragmentary sectional view on the line 8—8 of Figure 6.

The lower portion of the plate 11 is longitudinally extended and the under face of the plate 11 is formed to provide the dove-tailed recess 23. Coacting with this reel and reel casing, as described, is a base, which in Figure 4 is illustrated as consisting of a short length of angle iron 24 having upon its horizontal flange the upwardly projecting dove-tailed rib 25 which is adapted to engage in the dove-tailed recess 23, so that the reel casing may be slid on and off the base.

Preferably, and for a reason which will be later developed, the rib 25 is pivoted at its center by the screw 25[a] upon the upper flange of the angle iron 24 and the upper face of this angle iron is formed with an arcuate recess 26 extending through an angle of 90 degrees, and there is a pin 26[a] upon the under face of the rib 25 which engages in this recess so that this rib 25 may be turned thru a quarter revolution. The angle iron 24 in Figure 1 is mounted upon a vertical plate 27 by means of a clamp screw 28 which passes through a slot 29 formed in the vertical flange of the angle iron 24, the plate having an outwardly projecting lug 30 which has a width approximately that of the slot 29, but a length less than that of the slot, the screw 28 extending into this slot. A washer is disposed between the head of the screw and the plate 24, and by turning up the screw the plate may be clamped in any vertically adjusted position, the lug 30 preventing the plate 24 from rotating upon the screw, but permitting the plate to be vertically adjusted.

Extending from the plate 27 is an arm 31, the upper face of which is flush with the upper face of the plate 27, and the inner end of which is reinforced by an arcuate lug or thickened portion 32. The outer end of this arm 31 has a downwardly extending flange or lug 33 through which passes a screw 34. The arm 31 is semi-circular in cross-section, and is adapted to fit within the roll seat *b* of a roll stand B, as illustrated in Figure 1, and the distance between the thickened portion 32 and the end of the screw 34 when screw 34 is driven home is equal to the width of the roll stand at this point, so that the member may be seated within the seat *b* on the roll stand and the screw 34 turned up to thereby secure this reel supporting base upon the roll stand with the axis of the upper face of the arm 31 coincident with the axis of the bearing *b*. The above described parts taken collectively, I prefer to designate as a wire retaining member, or wire holding member.

Figure 11:
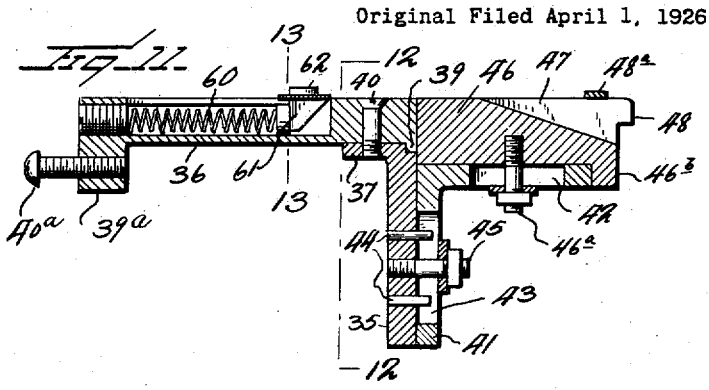
Figure 11 is a longitudinal section on the line 11—11 of Figure 10.
Figure 12:
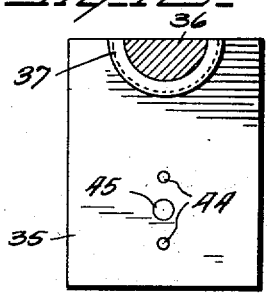
Figure 12 is a section on the line 12—12 of Figure 11.
Figure 10:
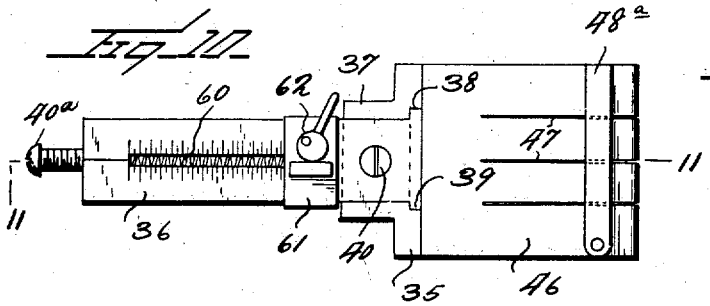
Figure 10 is a top plan view of the anchor support.
Figure 13:
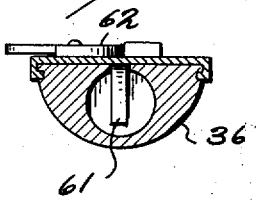
Figure 13 is a section on the line 13—13 of Figure 11.
Figure 16:
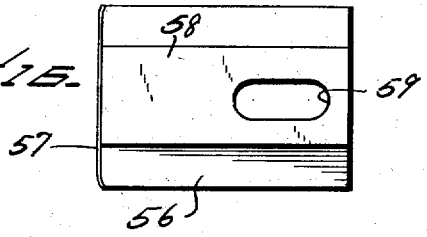
Figure 16 is a top plan view of the base shown in Figure 15.
Figure 14:
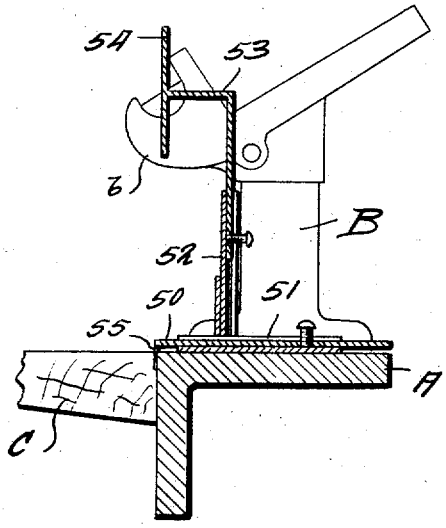
Figure 14 is a section through the roll stand supporting beam, showing one of the roll stands in elevation and showing my improved gauge in section.

At the opposite end of the beam A, or rather on the roll stand at the opposite end of this beam, there is mounted an anchoring means disclosed in Figure 11 and comprising a roll stand clamping member and an anchoring plate. As illustrated, the roll stand clamping member comprises a vertical plate 35 to which is detachably connected the arm 36. Preferably, and as illustrated in Figure 10, the plate 35 has an outwardly projecting flange 37 which is formed with a recess for the reception of the inner end of the arm 36 and the end of this recess is countersunk, as at 38, and the end of the arm is formed with a flange 39 on the sides and bottom thereof, fitting in this countersunk portion and the arm is held in place by means of a screw 40. This arm 36 has the form of the arm 31 and is, therefore, semi-circular in cross-section and at its other extremity is provided with a downwardly extending lug 39[a] through which passes the screw 40[a], thus adapting these parts to be secured upon the roll stand with the arm 36 disposed in the forward roll seat *b*.

Attached to this supporting plate 35 is an angle iron 41 mounted upon its horizontal face with a longitudinally extending slot 42 and upon its vertical flange with the vertical slot 43. The plate 35 is provided with two pins 44 arranged in vertical alignment and adapted to extend into the slot 43 and act precisely similar to the lug 30, and also extending from the plate 35 and through the slot 43 is a clamp screw 45 which is adapted to be turned home so as to clamp the angle iron 41 in its adjusted position upon the plate 35. Resting upon the upper face of the angle iron 41 is the anchoring member 46 which is rectangular in form and provided with a plurality of kerfs 47, the bottoms of which extend downward and outward, as indicated in Figure 11, these kerfs being of a width large enough to receive the wire 15.

The end of this plate is formed with a transverse flange or lip 48 and the extremity of the wire has a head, loop or notch which may be engaged beneath this lip to thus firmly anchor the free extremity of the wire. The wire is held in place in the kerfs 47 by means of a turn button or equivalent device 48[a]. The above parts 35 to 48[a] are also broadly termed a wire retaining member, or wire holding member.

It will be seen that with the mechanism heretofore described the reel support and the anchor support may be secured in position on the roll stands and held with the upper faces of the arms 31 or 36 disposed at any desired inclination but always centered within the bearings of the roll stands so that a longitudinal line drawn along the upper faces of these arms will be coincident with the common axis of the forward bearings of the two end roll stands.

For use intermediate the ends of the stands, I provide a gauge piece designated 49, which is semi-circular in cross section and adapted to rest within the bearing *b* of any one of the intermediate roll stands and whose upper flat face is provided with a longitudinally extending index line 49[a] which, if the roll stands are in proper alinement, should be coincident with the wire 15. This mechanism will indicate, of course, whether or not the roll stands are in proper alignment both vertically and horizontally, and particularly if the roll stand bearings are in proper alignment, and it will be obvious that this mechanism may be used on any make of roll stands, whether these extend straight upward or upward and forward or forward and rearward.

Preferably a tension indicating member will be used with the anchoring device, as will be later described. Used in connection with the wire supporting and tensioning device which I have described, is a gauge which forms the subject-matter of my Patent No. 1,591,485. This gauge is fully described in detail in said patent, and there is no necessity, therefore, of detailing the construction in the present case but it is sufficient to say that the gauge comprises a base 50 having mounted thereon a slide 51 which carries a vertical standard 52 formed in two vertically adjustable sections, the faces of these sections being graduated in thirty-seconds of an inch by horizontal graduations, the upper end of the standard being right angularly bent, as at 53, and also graduated longitudinally, this angular portion 53 of the standard carrying upon it a vertically disposed plate 54 whose outer and inner surfaces are both transversely graduated in thirty-seconds of an inch. The standard 52, as before remarked, is formed in two sections and these sections are adjustable upon each other so as to increase or decrease the height of the standard from the base and the standard itself is slidably mounted upon the base 50. The forward end of the base 50 is formed with a downwardly extending, relatively thin lug 55 which is adapted to engage in the crack or space which is always found between the inner edge of the thread board and the outer face of the roll beam. This gauge is made of relatively heavy material, sufficiently heavy to be rigid, except the lug 55 which is, of course, thin and the two sections of the vertical portion of the gauge are engaged with each other in adjusted positions by means of a set screw and the standard 52 is held upon the base 50 in adjusted position by means of a set screw or like equivalent device.

This gauge may be used in connection with the wire 15 supported on the roll stands by engaging the lug 55 in the crack between the guide board and roll beam, then adjusting the standard 52 upon the base 50 and adjusting the height of the standard 52 so as to bring any desired graduation on either the horizontal portion 53, the face of the standard 52 or the plate 54 in coincidence with the wire as it is supported on the end roll stands and then fastening the parts so that they can not move and shifting the gauge longitudinally and observing the position of the wire with reference to the graduations. Thus, for instance, if the beam is perfectly true both horizontally and vertically the wire will always strike exactly the same graduation on the portion 53 of the gauge as the gauge is shifted along the beam but, on the contrary, if the beam deviates vertically from a truly horizontal position at any one point, the wire will not be coincident with the same graduation on the gauge but will be either above or below the graduation on the portion 54 with which it should correlate and the amount of this deviation may be read upon the gauge, and thus it will be seen exactly how far the beam is either sunk at any particular point or elevated at any particular point and the proper adjustment may be made by means of the usual adjusting screws attached to the legs of the frame or by any other means. Likewise, if the beam is in longitudinal alignment throughout its length the wire will read upon one single horizontally disposed graduation as the gauge is shifted from one end of the beam to the other, but if the beam should not be longitudinally aligned then the wire will shift away from a horizontally disposed graduation on the gauge or with reference to one of the graduations on the portion 54, and by adjusting the gauge or reading the graduations immediatey below the wire the amount of the deviation from vertical alignment may be readily seen and proper correction made, and should the machine be out of alinement laterally, then the wire would shift away from a given marking on the portion 53.

Thus it will be seen that by securing the wire upon the roll stands that the device may be used for lining up the stands and the top and side of the beam. Furthermore, by using the wire in this manner it is possible to gauge the true horizontality both laterally and longitudinally of the entire machine for the reason that a level D such as illustrated in the drawings may be hung upon this wire and shifted along this wire from one end to the other of the machine and the level will indicate whether the wire is horizontal longitudinally and, of course, after the machine has been properly adjusted so that its parts are parallel to the wire, it will indicate whether the machine is horizontal.

This construction further permits the device to be used for lining up the spindle rail of the machine if desired, though by my system of lining and leveling the machine through the use of a wire extending through the bearings of the roll stands it is not necessary to line up the spindle rail. The device permits the lining up of the spindle rail, however, if desired. This may be done by securing the reel supporting member upon one end of the spindle rail and the anchor plate supporting member upon the other end of the spindle rail. The anchor plate 46 is made so that it may be turned upon the horizontal flange of the member 41 into a position at right angles to the clamping arm 36. This is accomplished by providing the anchoring plate 46 with a stud bolt 46[a] which passes through the slot 42. By loosening the nut on the stud bolt the plate 46 may be shifted and rotated a quarter turn and then again engaged with the flange of the member 41. The plate 46 has a lip 46[b] which engages over the edge of the horizontal flange of member 41 in either position of the anchor plate. Thus it will be seen the clamping arm 36 may be extended across the rail and engaged by means of the screw 40 and the slots 47 will extend parallel to the end of the rail. The reel supporting member is also disposed at right angles to the arm 31 by reason of the fact that the dove-tailed lug 25 is rotatable through a quarter of a revolution, as heretofore described, so that the reel may be so disposed that the wire 15 extends at right angles to the clamping arm 31.

Figure 15:
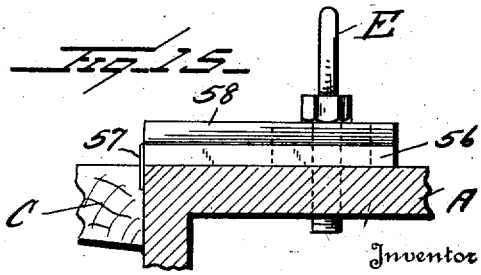
Figure 15 shows a modified form of reel support capable of being engaged with the roll supporting beam by means of the usual lever screws.

I do not wish to be limited to securing this wire to the roll stands, the stand supporting beam, etc., but in Figure 15 I illustrate a base 56 adapted to be used under certain circumstances in connection with the reel which has been illustrated. This base 56 is provided on its front edge with a downwardly extending, relatively thin flange or plate 57 adapted to engage in the crack between the thread board and the roll beam and thereby held always at a definite distance from the forward edge of the roll beam, this plate or base having the upwardly extending dove-tailed rib 58 adapted to engage in the dove-tailed recess 23 in the lower face of the reel support. This base is longitudinally slotted as at 59, the slot passing through the rib 58 and the slot permitting the engagement of this base by means of the usual lever screw E of the machine. The anchor plate is mounted in the same manner upon the face of the roll supporting beam by means of the adjacent lever screw and the wire of the reel may thus be used for the purpose of truing up or aligning both vertically and horizontally the top of the beam.

While in many instances it is not necessary, yet under some circumstances it would be well to provide means whereby the tension on the wire 15 may be indicated or exactly measured so that the sag of the wire for a certain number of feet with the wire under a certain degree of tension may be allowed for. To this end I may attach to the anchoring device a tension measuring scale with which the wire 15 may be connected so that the strain upon the wire is clearly indicated. Thus in Figure 11, I have illustrated the arm 36 as enclosing a spring 60, the upper face of the arm 36 being slotted and there being a slide 61 movable along its upper face and operatively engaged by said spring, this slide carrying upon it a wire clamp 62 by which the wire may be engaged without injuring the wire. The face of the arm 36 may be calibrated so that the position of the slide 61 may be read thereon and thus the tension indicated.

In this use of the device, the wire will be engaged in one of the slots or kerfs 47 in the usual manner, then whatever slack there is in the wire may be taken up and the wire rendered fairly taut and then the clamp 62 engaged with the wire, the extremity of the wire would then be released from its engagement with the slot and the strain upon the wire measured on the graduated face of the arm 36, and then reference would be made to a table which would accompany the mechanism, which table would give the amount of sag for a wire stretching forty-five feet or any desired number of feet under strain of so many pounds and allowance could be made for this sag.

While I have illustrated the spring 60 as being disposed within the arm 36, I do not wish to be limited to this, as many modifications might be made in this portion of the mechanism without departing from the spirit of the invention as defined in the appended claims. Preferably the arm 36 is detachable from the plate 35 so that the entire anchoring device need not be thrown aside in case the arm 36 should be broken off, as it is somewhat liable to be. It will be seen that the reel may be readily removed from its engagement with its base so that the reel and the base are rendered more portable and the reel may be readily carried in the pocket. It is obvious that various bases might be formed with a dove-tailed rib, with which various bases one reel could be engaged.

One of the objects of having the plate 25 rotatable through a quarter of a circle and for permitting the anchor plate 46 to be disposed at right angles to its normal position is to permit these parts to be used in leveling the spinning mechanism transversely. Thus many times it is not necessary to release the reel supporting base from its engagement with the spinning frame but only necessary to withdraw the reel to rotate the dove-tailed rib a quarter of a turn so that it stands parallel to the arm 31 and then reapply the reel and transfer the anchoring device or both the members 35 and 46 to the opposite side of the machine. Then the wire 15 will extend transversely of the machine.

It will be noted that my mechanism provides for testing the horizontality, both longitudinally and laterally, of the machine and the particular parts of it as well as adjusting the vertical alinement of these parts simultaneously in one operation, and furthermore, that it permits the roll stands and the beam both as regards the top and the side face to be lined up and leveled simultaneously without any changing of the indicating wire. By the old way of testing these parts, a wire or cord was stretched tautly along the roll stands and along the stand supporting beam to test the horizontality and then test the vertical alinement of the beam and the roll stands, and if this was impossible due to the interference of the guide board or other parts, the test had to be made on the spindle rail.

While I have illustrated certain details of construction and arrangement of parts which I have found particularly effective in actual practice, I do not wish to be limited to this, as it is obvious that many changes might be made in these details without departing from the spirit of the invention as defined in the appended claims. Furthermore, I do not wish to be limited to the use of this mechanism in connection with leveling up and alining spinning frames or machines, as it is capable of use with fly frames as well, and obviously might be modified for use with a large number of different mechanisms when necessary to test for proper alinement and leveling from time to time.

I claim:

1. Means for leveling and lining machinery comprising a pair of clamps, each having a base, a member mounted on one base for turning through a quarter of a circle, a reel mounted upon the member on said base, a wire attached to the reel, and a wire anchor mounted upon the other base and having means for detachably engaging the end of the wire.

2. Means for lining and leveling machinery including a clamp, a wire reel, a wire mounted thereon, the reel and the clamp having, one a dove-tailed rib mounted for turning through a quarter circle and the other having a recess engaging said rib.

3. Means for lining and leveling machinery including a reel comprising a supporting member having a face, a shaft passing through the supporting member, a peripherally grooved disk mounted upon the shaft adjacent the face of the supporting member and rotatable with the shaft, the disk being recessed upon the face confronting the face of said supporting member, the disk being provided with a series of ratchet notches, a pawl engaging said ratchet notches to thereby hold the disk under strain, and friction means disposed between the disk and the supporting member for yieldingly resisting free rotation of the disk.

4. Means for lining and leveling spinning machines comprising a pair of clamps, each clamp including a vertically disposed plate having a horizontally disposed arm semi-circular in cross section and adapted to lie within the roll bearing of a roll stand and having means for clamping it therein and an angular bracket mounted upon each of said plates for vertical adjustment, a wire reel, detachably carried upon the angular bracket of one clamp, a wire anchoring member carried upon the bracket of the other clamp, and a wire carried by the reel, the reel and anchoring member being adapted to support the wire in line with the longitudinal axis of and resting upon the upper face of each of said arms.

5. Means for lining and leveling spinning machinery including a pair of clamps adapted to engage two separate roll stands of a spinning machine, a wire, means on each clamp for engaging the ends of the wire so as to support the wire in alignment with certain like portions of the two roll stands, and an intermediate member having a mark thereon adapted to be disposed in connection with the like portion of intermediate roll stands, said wire being alined with said mark when the roll stands are in line.

6. Means for leveling and lining machinery comprising a wire, a pair of wire retaining members, each having a base, a member mounted on one base for turning through a quarter of a circle, a reel mounted upon the member on the other base, said wire having one end attached to the reel, and a wire anchor mounted upon the other base and having means for detachably engaging the other end of the wire.

7. Means for lining and leveling machinery including a support, a wire reel, a wire mounted thereon, the reel and the support having, one a dove-tailed rib mounted thereon for turning through a quarter circle and the other having a dove-tailed recess engaging said rib.

8. Means for lining and leveling spinning machines comprising a pair of supports, each including a vertically disposed plate having a horizontally disposed arm semi-circular in cross-section and adapted to lie within the roll bearing of a roll stand and having means for securing the arms in the bearing and an angular bracket mounted upon each of said plates for vertical adjustment, a wire reel detachably carried upon the angular bracket of one of said supports, a wire anchoring member carried upon the bracket of the other support, and a wire carried by the reel, the reel and support being adapted to support the wire in line with the longitudinal axis of and resting upon the upper face of each of said arms.

9. Means for lining and leveling spinning machines including a pair of supports adapted to engage two separated roll stands of a machine, a wire, means on each support for engaging the ends of the wire so as to support the wire in alinement with certain like portions of the two roll stands and an intermediate member having a marking thereon adapted to be disposed in connection with the like portion of an intermediate roll stand, said wire being alined with said marking when the roll stand is in line.

10. Means for lining and leveling machinery comprising a pair of separate wire-retaining members adapted to be secured to two points on a machine, a wire, one retaining member being adapted to engage and tension the wire, and the other retaining member being adapted to hold the wire, one of said wire retaining members having means permitting adjustment of a portion of the wire retaining member both horizontally and vertically with relation to the machine, and means included in one of the retaining members for determining the tension under which the wire is placed.

11. Means for lining and leveling a machine comprising a pair of separated wire retaining members having means for securing the same to two points on a machine, a wire, means included in one retaining member adapted to engage and tension the wire, means included in the other retaining member adapted to hold one end of the wire, means included in one of the retaining members for determining the tension under which the wire is placed, and means for permitting the moving of a portion of one of the wire retaining members both horizontally and vertically with relation to the machine while the wire is under tension.

12. Means for lining and leveling machinery comprising a pair of separated wire retaining members having means for securing the same to two points on a machine, a wire, means included in one retaining member adapted to engage and tension the wire, means included in the other retaining member adapted to hold the wire, at least one of said wire retaining members having means for permitting adjustment of the position of the wire both horizontally and vertically with relation to the machine while the wire is under tension, and means for determining the tension under which the wire is placed.

13. Means for lining and leveling a machine comprising a wire, means for stretching the wire between two points on a machine, said means comprising a pair of wire retaining members adapted to be secured to two portions of a machine, at least one of said wire retaining members being both vertically and horizontally adjustable with relation to the machine while the wire is under tension, and a gauge shiftable along the machine, said gauge having a downwardly projecting portion adapted to follow the edge of the machine, whereby horizontal and vertical variations from the wire, of points on the machine may be detected and determined.

14. Means for leveling and lining a machine comprising a pair of members adapted to be secured to two portions of a machine at a time, a wire, a reel with which one end of the wire is connected, said reel being detachably connected to one of said members and being both laterally and vertically adjustable with relation to one of said members to which it is attached, the other member being adapted to engage the other end of the wire, said other member comprising an anchoring member to which the wire is adapted to be secured, and a tension registering device to which the wire is adapted to be secured when not secured to the anchoring device.

15. In a lining and leveling device for machinery a wire, means adapted to be secured to two points on the machine for stretching the wire between two points on the machine, and including means for allowing adjustment of the position of the wire and stretching means both laterally and vertically with relation to the machine, and means for determining the tension under which the wire is placed.

16. Means for lining the bearings of roll stands and the like comprising wire supporting means having means for securing said supporting means in separated roll stands of a spinning frame, means associated with said wire supporting means permitting both lateral and vertical adjustment of the wire with relation to the roll stands while under tension, and means for determining the tension of the wire.

17. Means for lining and leveling the roll stands of a spining frame and the like, comprising wire retaining members having means for securing the same to two separated roll stands and having means for securing the wire to said wire retaining members and having means for permitting adjustment of the wire both laterally and vertically with relation to said roll stands and also having means for determining the tension under which the wire is placed.

In testimony whereof, I affix my signature.

ALBERT M. GUILLET.